(12) United States Patent
Rohrig

(10) Patent No.: US 9,999,574 B2
(45) Date of Patent: *Jun. 19, 2018

(54) METHOD FOR PRODUCING A PACIFIER TEAT, AND PACIFIER TEAT

(71) Applicant: MAM BABYARTIKEL GESELLSCHAFT M.B.H., Vienna (AT)

(72) Inventor: Peter Rohrig, Vienna (AT)

(73) Assignee: MAM BABYARTIKEL GESELLSCHAFT M.B.H., Vienna (AT)

( * ) Notice: Subject to any disclaimer, the term of this patent is extended or adjusted under 35 U.S.C. 154(b) by 343 days.

This patent is subject to a terminal disclaimer.

(21) Appl. No.: 14/863,696

(22) Filed: Sep. 24, 2015

(65) Prior Publication Data

US 2016/0030291 A1    Feb. 4, 2016

Related U.S. Application Data

(62) Division of application No. 13/984,232, filed as application No. PCT/AT2012/000025 on Feb. 10, 2012.

(30) Foreign Application Priority Data

Feb. 11, 2011  (AT) .................. A 188/2011

(51) Int. Cl.
*B29C 45/72* (2006.01)
*A61J 11/00* (2006.01)
(Continued)

(52) U.S. Cl.
CPC ....... *A61J 11/007* (2013.01); *B29C 45/14336* (2013.01); *B29C 45/7207* (2013.01); *B29D 22/00* (2013.01); *A61J 17/001* (2015.05)

(58) Field of Classification Search
CPC .................................................... B29C 66/431
See application file for complete search history.

(56) References Cited

U.S. PATENT DOCUMENTS 1,289,777  A   12/1918  Mahoney
2,520,773  A    8/1950  Muller
(Continued)

FOREIGN PATENT DOCUMENTS

AT         506295 A4    8/2009
CN        2790474 Y     6/2006
(Continued)

OTHER PUBLICATIONS

Austrian Search Report dated Jul. 15, 2010; Appln. No. A1444/2009.
(Continued)

*Primary Examiner* — Jill L Heitbrink
(74) *Attorney, Agent, or Firm* — Ladas & Parry LLP

(57) ABSTRACT

A method for producing a pacifier teat, and a pacifier teat with a teat section which forms a hollow space and which is adjoined by a stem, wherein an elastic hollow body comprising the teat section and the stem is injection molded or pre-formed by a dipping method, and opposite wall sections of the pre-formed hollow body are connected to each other in the region of the stem.

12 Claims, 7 Drawing Sheets

(51) Int. Cl.
*B29D 22/00* (2006.01)
*B29C 45/14* (2006.01)
*A61J 17/00* (2006.01)

(56) References Cited

U.S. PATENT DOCUMENTS

| | | | |
|---|---|---|---|
| 3,832,437 | A | 8/1974 | Taylor |
| 3,923,067 | A | 12/1975 | Hurst |
| 3,924,621 | A | 12/1975 | Cassimally |
| 4,143,452 | A * | 3/1979 | Hakim .................. A61J 17/001 156/245 |
| 6,041,950 | A | 3/2000 | Soehnlein |
| 7,144,416 | B2 | 12/2006 | Struckmeier et al. |
| 8,636,768 | B2 | 1/2014 | Rohrig |
| 2002/0173698 | A1 | 11/2002 | Morningstar |
| 2009/0306712 | A1 | 12/2009 | Rohrig |
| 2010/0268276 | A1 | 10/2010 | Du Chesne et al. |
| 2010/0312276 | A1* | 12/2010 | Schofield .............. A61J 17/001 606/236 |

FOREIGN PATENT DOCUMENTS

| | | |
|---|---|---|
| DE | 828288 C | 7/1949 |
| DE | 4318693 A1 | 12/1994 |
| DE | 10227787 A1 | 10/2003 |
| EP | 0478167 A2 | 4/1992 |
| EP | 1086804 A2 | 3/2001 |
| FR | 1119283 | 6/1956 |
| GB | 8869 | 4/1907 |
| GB | 18258 | 8/1911 |
| GB | 130747 A | 8/1919 |
| GB | 2168283 A | 6/1986 |
| GB | 2192549 A | 1/1988 |
| JP | 09-267392 A | 10/1997 |
| WO | 86/03402 A1 | 6/1986 |
| WO | 96/20687 A1 | 7/1996 |
| WO | 98/02132 A1 | 1/1998 |
| WO | 98/27928 A1 | 7/1998 |
| WO | 99/04745 A1 | 2/1999 |
| WO | 02/091954 A2 | 11/2002 |
| WO | 2004/087039 A1 | 10/2004 |

OTHER PUBLICATIONS

International Search Report dated Dec. 12, 2010, PCT/AT2010/000326.
International Preliminary Report on Patentability dated Aug. 13, 2013; PCT/AT2012/000025.
Australian Patent Examination Report No. 2; dated Mar. 10, 2014, Appln. No. 2010292955.
Chinese Office Action dated Dec. 27, 2013; Appln. No. 201080051226.4.
First Chinese Office Action dated May 5, 2015; Appln. No. 201280017920.3.
EPO Communication dated Feb. 21, 2014; Appln. No. 10760215.3-1706 (Google Machine Translation).
USPTO RR dated Sep. 9, 2013 in connection with U.S. Appl. No. 13/058,704.
USPTO NFOA dated Jan. 17, 2014 in connection with U.S. Appl. No. 13/058,704.
USPTO RR dated Feb. 11, 2014 in connection with U.S. Appl. No. 13/984,232.
USPTO NOA dated May 14, 2014 in connection with U.S. Appl. No. 13/058,704.
USPTO NFOA dated May 21, 2014 in connection with U.S. Appl. No. 13/984,232.
USPTO FOA dated Sep. 9, 2014 in connection with U.S. Appl. No. 13/984,232.
USPTO NFOA dated Mar. 26, 2015 in connection with U.S. Appl. No. 13/984,232.
European Examination Report dated Jun. 28, 2016; Appln. No. 12 706 434.3-1651.

* cited by examiner

METHOD FOR PRODUCING A PACIFIER TEAT, AND PACIFIER TEAT

The invention relates to a method for producing a pacifier teat with a teat section which forms a hollow space and which is adjoined by a stem, and a pacifier teat with a teat section which forms a hollow space and which is adjoined by a stem.

A plurality of very different pacifiers having a teat element fixed to a shield is already known. These teat elements consist of a hollow body so that the hollow body deforms elastically when suction is being applied by the child, with the hollow space enclosed by the teat walls thus being reduced. If the baby or infant using the pacifier does not apply any suction to the hollow body, the latter will reassume its initial shape. This usual shape of hollow-body teats substantially corresponds to a club-shape, i.e. a stem section via which the hollow-body teat is connected to the shield, having at comparably small cross-section and broadening into a freely cantilevering nipple part and/or teat section which consequently has a comparably large cross-section.

However, the use of such pacifiers by babies or infants has the negative effect that the teeth rows of the baby or infant cannot be fully closed in the region of the stem of the pacifier. In the region of contact with the jaw and/or the teeth, in particular, the elastic restoring force of the hollow space is applied to the jaw and/or the teeth of the infant. This may contribute to causing a frontally-open bite, i.e. a malposition of the teeth of the growing child.

It is already known from WO 99/04745 A to provide a conventional hollow-body teat with a comparably planar transmitter body which is angled, so that the transmitter body may be received between the upper and lower incisors of an infant, thus trying to substantially allow a closing of the incisors. Due to the design of the teat as a hollow-body, however, this angled transmitter body has to be double-walled as well so that a comparably high wall thickness is also achieved in the region of the transmitter body, which is planar compared to the remaining parts of the teat.

A similar solution has also been described in WO 98/02132 A, but here a special teat body is provided, which is arranged beneath the lip of the baby or the infant in its used position, so as to allow contact between the lips and the upper palatal area.

Further special orthodontic hollow-body teats are known, for example, from DE 102 27 787 A, DE 43 18 693 A as well as DE 828 288 C. Due to the double-walled design of the hollow body, however, the wall thickness of the hollow-body teat is limited downwards in the region of contact with the jaw and/or teeth as well.

Moreover, a pacifier teat with a substantially closed-walled, round-bodied teat body is disclosed in U.S. Pat. No. 3,924,621, connected to the pacifier shield via a plurality of connecting elements, wherein an opening remains between the connecting elements so the tongue of the child may enter this free space. This is intended to allow direct contact between the tongue of the child and the upper front teeth as well as the palate. The lateral connecting elements are intended to act as a type of guide in order to direct the tongue into its natural position.

A teat part with a solidly designed cross-section, in which a variety of ventilation grooves may be provided, is known from WO 2004/087039 A.

WO 98/27928 A1 discloses a conventional hollow-body teat or, alternatively, a teat section having an entirely solid-walled design. A pocket for receiving a tablet is provided in the hollow body or the entirely solid-walled teat section.

WO 96/20687 A1 shows a pacifier with a special teat part comprising protrusions in the direction of the alveolar ridges. Here, the entire teat body may be hollow or have a solid design.

WO 86/03402 A1 shows merely a pacifier made of silicone rubber having a conventional hollow teat body. Moreover, a method for injection moulding a hollow body made of silicone rubber is known from GB 2168283 A.

U.S. Pat. No. 3,832,437 discloses a method for manufacturing a hollow body wherein the mandrel used for shaping the hollow space is removed through a temporarily enlarged opening of the mould before the workpiece has completed curing, whereupon the opening of the mould is fully closed before the curing is finished so no opening remains in the workpiece.

It is the object of the present invention, however, to provide a method for manufacturing a pacifier teat wherein a teat, substantially of the type of known hollow-body teats, is manufactured, wherein, in the region of contact with the jaw and/or the region of the teeth closing, the pacifier teat is formed in such a manner that a frontally-open bite caused partially by the use of the pacifier teat is prevented as effectively as possible.

According to the invention, this is achieved by a method of the initially mentioned type, wherein an elastic hollow body comprising the teat section and the stem is injection moulded or pre-formed by a dipping method and opposite wall sections of the pre-formed hollow body are connected to each other in the region of the stem. According to the invention therefore, a two-step method is provided, wherein, first, a hollow body having substantially the outer shape of known hollow-body teats is produced. After pre-forming this hollow-body pacifier teat, opposite wall sections of the hollow body are connected to each other in the region of the stem, so a substantially single-walled design of the pacifier teat being formed as a hollow body in the teat section is created in the region of the stem, i. e. the region of contact with the jaw and/or the teeth of the infant. This manufacturing process, in particular, prevents the completed pacifier teat from applying pressure to the jaw and/or the teeth due to the elastic restoring force of the hollow body in the region of contact with the jaw and/or the teeth, thus encouraging the forming of a frontally-open bite; i. e. advantageously, the elastic restoring force of the pacifier teat in the region of the stem is eliminated because of the permanent connection of opposite wall sections.

Advantageously, the connection of the opposite wall sections may be achieved by introducing a connecting material in viscous state between the opposite wall sections and then converting the connecting material into an elastic state by applying pressure and/or heat in order to connect the wall sections to one another. By introducing a viscous connecting material, the initially viscous connecting material connects closely to the wall sections during its transition to the elastic state, so the connected wall sections remain connected to each other even when tensile and/or strain forces are applied.

In order to have as little impact as possible on the elastic behaviour of the pacifier teat in the region of the stem, a material having substantially the same chemical composition as the material of the pre-formed hollow body may be provided as the viscous connecting material. This means that as long as the hollow body consists of a silicone rubber material or a (natural) rubber material, a silicone material or a latex material will advantageously be used as the viscous connecting material as well. When using such viscous connecting materials of the same type, an advantageous chemical cross-linking between the wall sections to be connected and the connecting material is formed during the curing process, i. e. when the viscous connecting material is converted into its elastic state, so a particularly tight connection of the wall sections, forming substantially a single homogeneous layer, is achieved. In order to obtain a reliable connection of the wall sections, on the one hand, while preventing the leaking of connecting material into the hollow space beyond the wall sections to be connected, on the other hand, it is favourable for approx. 0.5 to 3 ml, in particular substantially 1 to 2 ml, of viscous connecting material to be introduced between the wall sections to be connected.

In the case of a hollow body made of rubber it is favourable for the connecting material to have a share of 40 to 60% of latex and a viscosity of approx. 15 to 30 sec./Ford cup 5 during introduction between the wall sections to be connected. Advantageously, this leads to the introduced amount being distributed substantially evenly in the region of the wall sections of the hollow body being pressed together, due to the low viscosity of the latex concentrate.

Alternatively, however, a viscous connecting material with a chemical composition different from the material of the pre-formed hollow body may be used as well. Here, the connection of the wall sections is established by gluing, i. e. by adhesion and not by chemical or physical cross-linking.

A particularly close connection of the opposite wall sections may be achieved in a simple manner when the pre-formed hollow body consists of a rubber material that has not yet been completely vulcanised by establishing contact between the wall sections to be connected before the rubber material is completely vulcanised by adding heat. Rubber material as defined according to the invention is vulcanised rubber as it is extracted from the milky fluid (latex) of tropical plants in particular. Typically, the latex material or a latex mixture is heated and/or pre-vulcanised for approx. 24 hours at 40 to 70° C. before producing the pre-formed hollow body by dipping a mould into a latex bath; tests revealed that when shortening this time of pre-vulcanisation, heating the latex material or a latex mixture for preferably 18 to 22 hours, in particular substantially 20 hours, at approx. 40 to 70° C., preferably at substantially 50 to 55° C., the hollow body created is not yet completely vulcanised and its wall sections may be connected permanently in a simple manner by applying pressure and heating them—even without adding an external connecting material. Because of the shortened time of pre-vulcanisation the latex material or the latex mixture has a higher value on the swelling index for latex materials; the swelling value of the pre-formed, not completely vulcanised hollow body is preferably between 80 and 100, in particular substantially 90.

To establish a pressure equalisation between the substantially closed-walled teat section and the environment in order to make suction on the completed pacifier teat feel substantially like on conventional hollow-body pacifier teats for the infant, it is advantageous if the pre-formed hollow body comprises an opening, wherein a linear element extending into the hollow space created by the teat section is inserted into the pre-formed hollow body before connecting both wall sections to each other. Here, the opening of the pre-formed hollow body is provided on the free end of the stem, i. e. the section that is connected to a pacifier shield, so the duct formed through the linear element extends from the closed-walled teat section to the pacifier shield.

As an alternative to arranging a linear element in the hollow body while connecting the wall sections to each other, a duct-shaped indentation extending through the stem to an opening may be formed during the forming of the pre-formed hollow body in order to form a ventilation duct.

For the connecting of the two wall sections it has proven favourable to select the pressure for connecting the wall sections such that the wall thickness of the wall sections in the connecting region is reduced to at least 80% of the wall thickness of the wall sections before connecting the wall sections.

To remove undesired constituents from the material of the hollow body, which is especially advisable when producing the hollow body from natural latex, it is favourable to wash undesired chemical constituents such as nitrosamines off the hollow body before connecting the wall sections.

Furthermore, it is favourable, particularly with hollow bodies made of rubber, to heat the hollow body for preferably at least 30 minutes, in particular 30 to 45 minutes, at preferably 70 to 100° C. in its pressed state. This will effect a sufficient chemical cross-linking either between the wall sections themselves, in the case of hollow bodies made of rubber, or between an elastic connecting layer and the wall sections. It is also advantageous to heat the hollow body for 20 to 30 hours at approx. 70 to 100° C. when the wall sections are no longer pressed against each other; by doing so, a complete vulcanisation of the rubber material of the hollow body and the connecting material, if applicable, will be reliably obtained.

The pacifier teat of the initially mentioned type is characterised in that opposite wall sections of a pre-formed elastic hollow body, which has been formed by injection moulding or dipping, are connected to each other in the region of the stem. By connecting opposite wall sections in the region of the stem, the wall sections of the elastic hollow body that has been pre-formed before lose their restoring force in the region of the stem, so advantageously the pacifier teat does not apply any pressure to the regions of contact with the teeth and/or the jaw, which are provided in the region of the stem, during use.

In order to establish a preferably permanent connection of the opposite wall sections in a simple manner, it is favourable for the connected wall sections to be glued to each other.

A particularly close connection between the wall sections is obtained when the connected wall sections are chemically and/or physically cross-linked with each other; such a connection is virtually unbreakable, in particular when applying tensile stresses.

To enable a pressure equalisation between the substantially closed-walled teat section and the environment, it is favourable for at least one duct connecting the hollow space to an opening to be provided in the region of the stem.

Furthermore, a wall thickness as small as possible is useful in the region of the stem for increasing and obtaining the elastic restoring force of the hollow body when the wall in the region of the hollow space, in particular in the section adjoining the connecting region, has a larger wall thickness, at least in some sections, than the hollow body in the region of the stem before connecting the wall sections.

Below, the invention will be discussed in detail by means of a preferred exemplary embodiment, however, without being limited to it. In the individual drawings.

Figure 1:
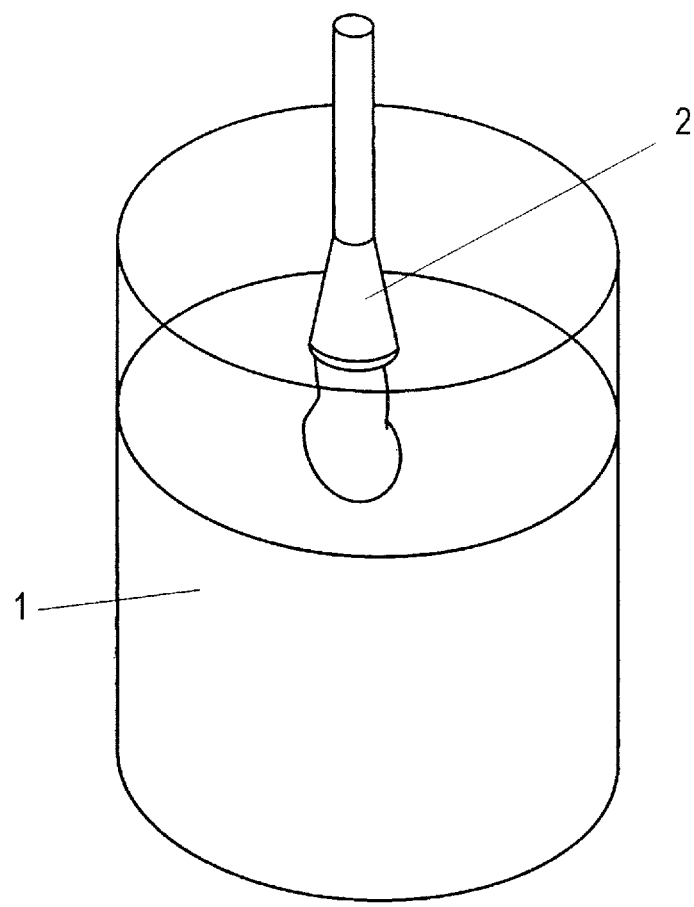
FIG. 1 shows a view of a dipping bath for manufacturing a pre-formed hollow body.

FIG. 1 shows a container 1 that is filled with a latex fluid. Preferably this is natural latex having a rubber share of approx. 60% and a rest consisting mainly of water. A dipping former 2 is immersed in the latex fluid for producing a pre-formed hollow body 3 (cf. FIG. 3). Here, the dipping former 2 is advantageously pre-heated to approx. 55 to 60° C. before immersing it in the latex bath.

Figure 2:
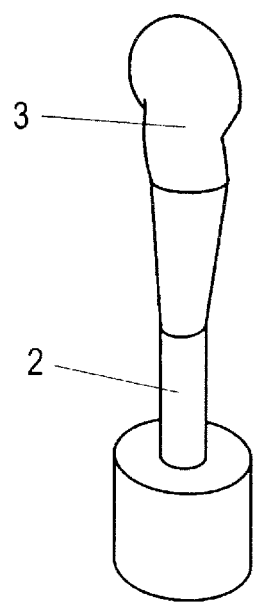
FIG. 2 shows a view of the pre-formed hollow body after removing the mould from the dipping bath.
Figure 3:
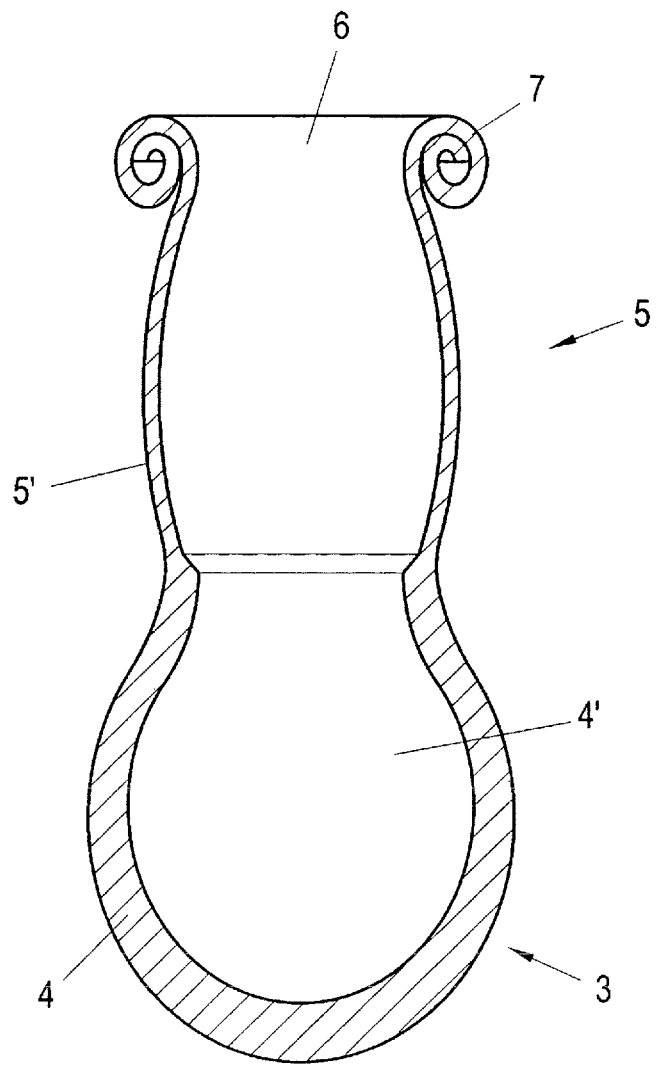
FIG. 3 shows a sectional view of a pre-formed hollow body with the wall sections not yet connected.

Next, FIGS. 2 and 3 show the pre-formed hollow body 3, with the hollow body 3 being not yet removed from the dipping former 2 in FIG. 2. Alternatively to the production by a dipping method, the hollow body 3 shown in FIG. 3 may also be manufactured in an injection mould (not shown in detail); the production by injection moulding is particularly favourable if the pre-formed hollow body 3 is made of silicone or a thermoplastic elastomer (TPE).

FIG. 3 shows the pre-formed hollow body 3 with a round-bodied hollow space 4' and/or teat section 4 and a stem 5 comprising an opening 6 at its end. In addition, the stem 5 comprises a flange 7 for connecting it to a pacifier shield 8 (cf. FIG. 10) at its end. The wall sections 5' in the region of the stem 5 are not yet connected to each other. In particular, it can be seen that the wall thickness may be smaller in the region of the stem 5 than in the region of the round-bodied teat section 4, which is particularly possible in a simple manner when producing a pre-formed hollow body 3 by injection moulding; when producing it by a dipping method, the pre-formed hollow body 3 usually has a substantially uniform wall thickness.

Figure 4:
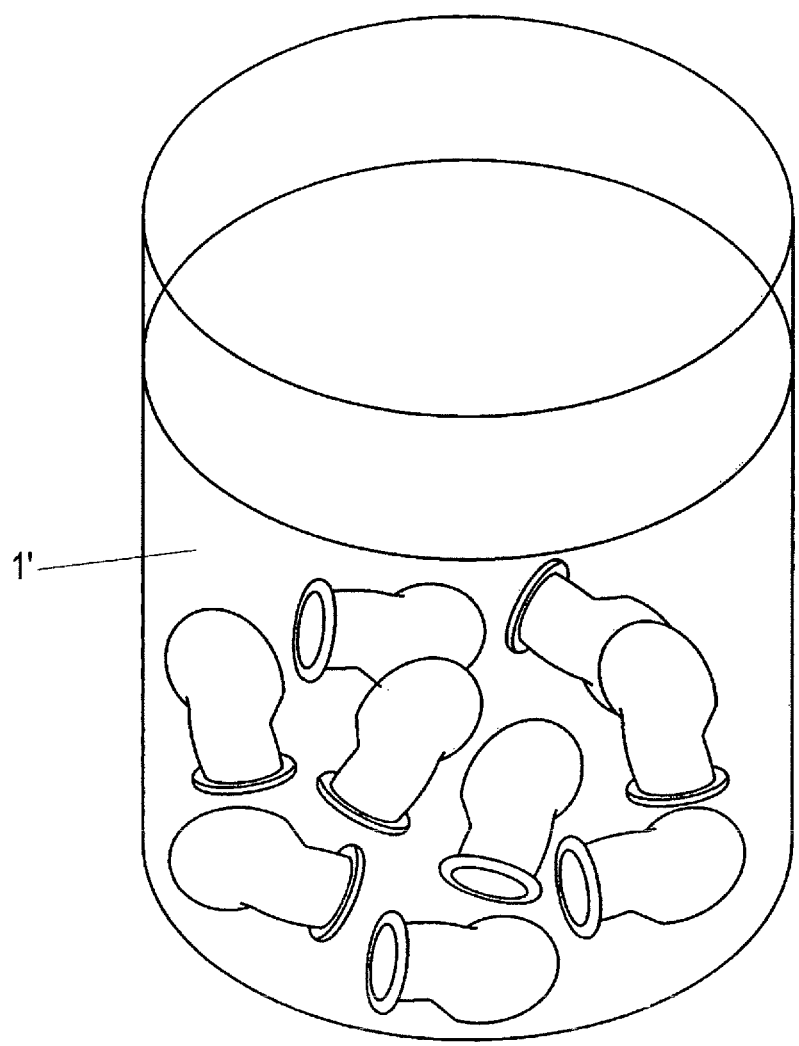
FIG. 4 shows a view of a washing solution for cleaning the pre-formed hollow body.

FIG. 4 shows a washing process as it is particularly common when producing pacifier teats from latex. Here, the pre-formed hollow bodies 3 are stored in a washing solution contained in a container 1' for approx. 24 to 30 hours in order to remove undesired constituents of natural latex, in particular nitrosamines, from the latex material.

Then wall sections 5' of the stem 5 are connected to each other at least in some sections, so the hollow body 3 does not exhibit any elastic restoring force for reassuming the shape shown in FIG. 3 after connecting the wall sections 5'.

Here, the wall sections 5' may be connected to each other either by a chemical and/or physical cross-linking or, however, glue bonding, i. e. an adhesive connection.

Figure 5:
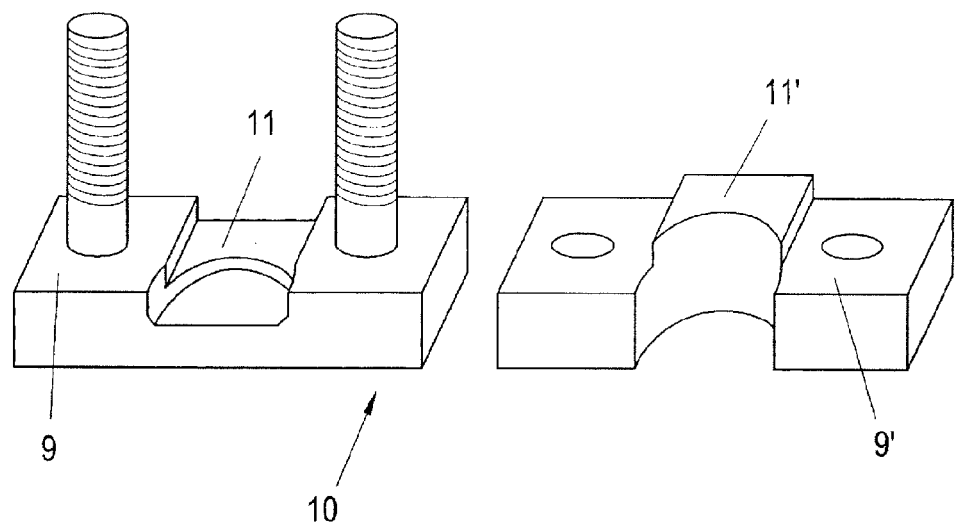
FIG. 5 shows a perspective view of a clamping device for connecting the wall sections of a hollow body in an open position.

In FIG. 5, a clamping device 10 comprising clamping parts 9, 9' can be seen. Here the clamping part 9 comprises a gap 11 provided for (partially) receiving the pre-formed hollow body 3. The clamping part 9', however, comprises a protrusion 11' provided for applying increased pressure to the wall sections 5' to be connected in the braced state of the clamping parts 9, 9'.

Figure 6:
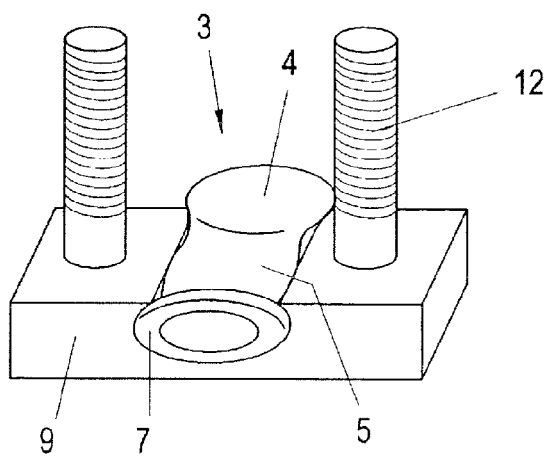
FIG. 6 shows a perspective view of the clamping device with a hollow body being placed on the lower part.

In the inserted state of the hollow body 3 within the clamping device 10 shown in FIG. 6, it can be seen that the round-bodied teat section 4 as well as the end of the stem 5 protrude beyond the corresponding clamping faces of the clamping device 10 in the region of the flange 7, so pressure is applied only in the region of the wall sections 5' to be connected, and a connection of the opposite wall sections 5' is established. The clamping parts 9, 9' may be pressed against each other by tensioning elements 12 such as a bolt-and-nut connection or hydraulically actuated bars or the like.

Before placing the clamping part 9' on top of the lower clamping part 9, a pin-shaped element 13 with a handle part 13' is inserted into the hollow body 3 (cf. FIG. 7a), so after connecting the wall sections 5' of the hollow body 3 a duct 14 remains in the region of the clamping faces between the hollow space 4' and the opening 6 of the then-completed pacifier teat 15. This guarantees a reliable pressure equalisation between the hollow space 4' and the environment even after connecting the wall sections 5' by means of the clamping device 10.

Figure 7:
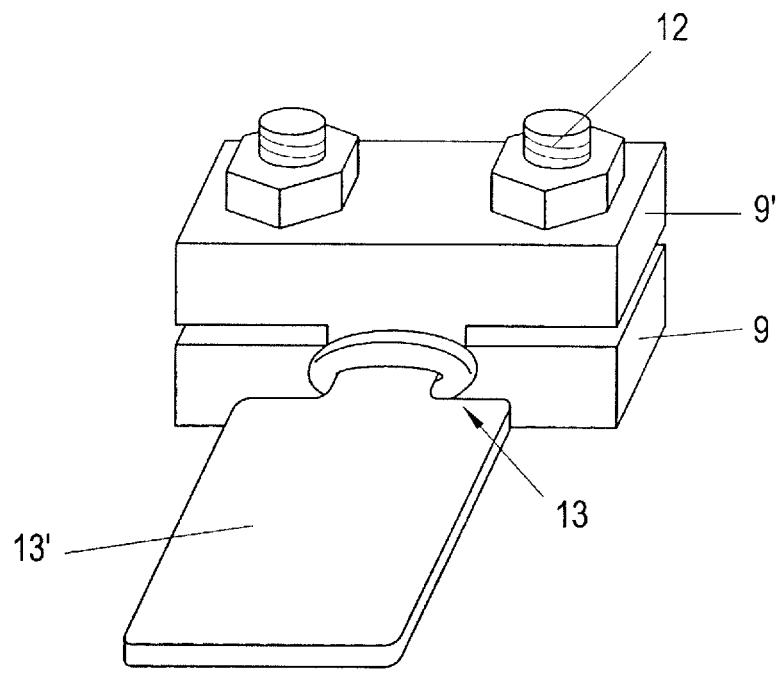
FIG. 7 shows a perspective view of the clamping device in a closed position.
Figure 7A:
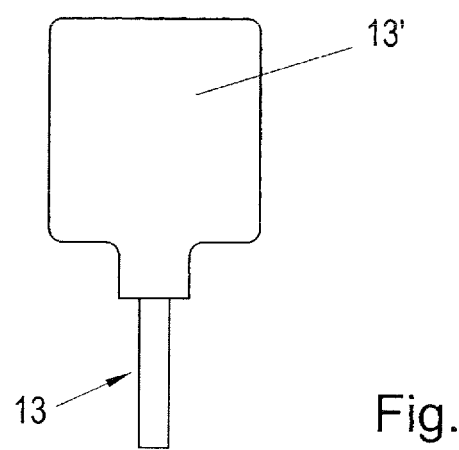
FIG. 7a shows a view of a pin element to be inserted into the hollow body.
Figure 8:
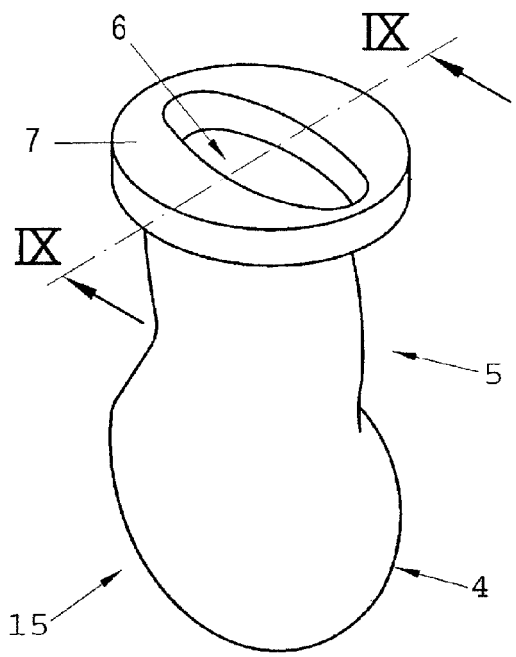
FIG. 8 shows a perspective view of a pacifier teat after connecting the wall sections.

The clamping device 10 shown in FIGS. 5 to 7 is particularly suitable for connecting wall sections of hollow bodies 3 made of natural rubber. For a close connection of the surfaces of the hollow body 3 in the region pressed together by the clamping faces, the rubber material of the hollow body 3 is not yet completely vulcanised when the pressure is applied. Next, the clamping device 10 including the hollow body 3 received therein is heated for approx. 30 to 45 minutes at approx. 70 to 80° C., so the rubber material is vulcanised further; this will effect a chemical cross-linking of the opposite wall sections 5' being pressed together so they are permanently connected to each other. Then the pacifier teats 15 are removed from the clamping device 10 and the pin-shaped elements 13 are removed from the pacifier teats 15 by means of the handles 13' before heating the pacifier teats 15 for approx. 24 to 30 hours at approx. 70 to 100° C. in a furnace in order to achieve a complete vulcanisation and/or drying of the rubber material.

Alternatively and/or additionally, a viscous latex connecting material such as natural rubber may be introduced into the region of the stem 5. Such a connecting material (=latex concentrate) has a latex share of approx. 40 to 60% and a viscosity of approx. 15 to 30 sec./Ford cup 5, so due to the low viscosity of the latex concentrate, the amount introduced, typically approx. 1 to 2 ml, distributes in a substantially uniform manner in the region of the wall sections 5' of the hollow body 3 that are pressed against each other. The amount of latex concentrate to be introduced is chosen so that no latex concentrate can enter the hollow space 4' but all of the latex concentrate introduced remains in the region of the wall sections 5' to be connected. After introducing the latex concentrate, the process is continued as previously described in order to connect the wall sections 5' to each other.

As long as no connecting material having substantially the same chemical composition is used, i. e. not a latex concentrate with a hollow body 3 pre-formed from latex as described above but a connecting material with a different chemical composition forming an adhesive layer after curing, a (gluing) connection of the wall sections 5' may be obtained irrespective of the material that the pre-formed hollow body consists of. Preferably, latex, silicone or a thermoplastic elastomer is used for producing the hollow body 3 and, consequently, the pacifier teat 15.

Figure 9:
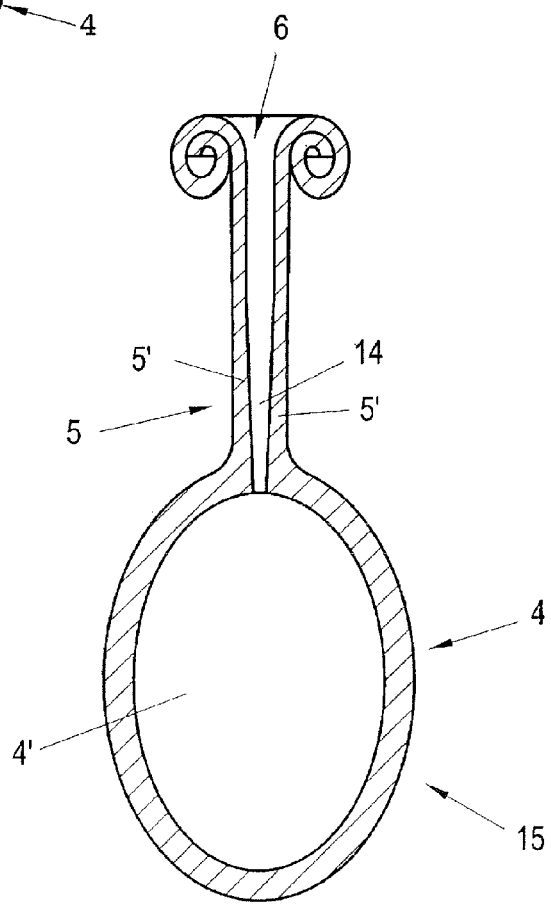
FIG. 9 shows a sectional view of the pacifier teat according to line IX-IX in FIG. 8.

As shown in FIG. 9., a duct 14 designed by the pin-shaped element 13 extends from the hollow space 4' via the stem 5 to the opening 6. The duct 14 is thus a connection from the hollow space 4' to the opening 6 with its larger cross-section and/or to the environment, so a pressure equalisation between the hollow space 4' of the pacifier teat 15 and the environment can be reliably achieved.

Figure 10:
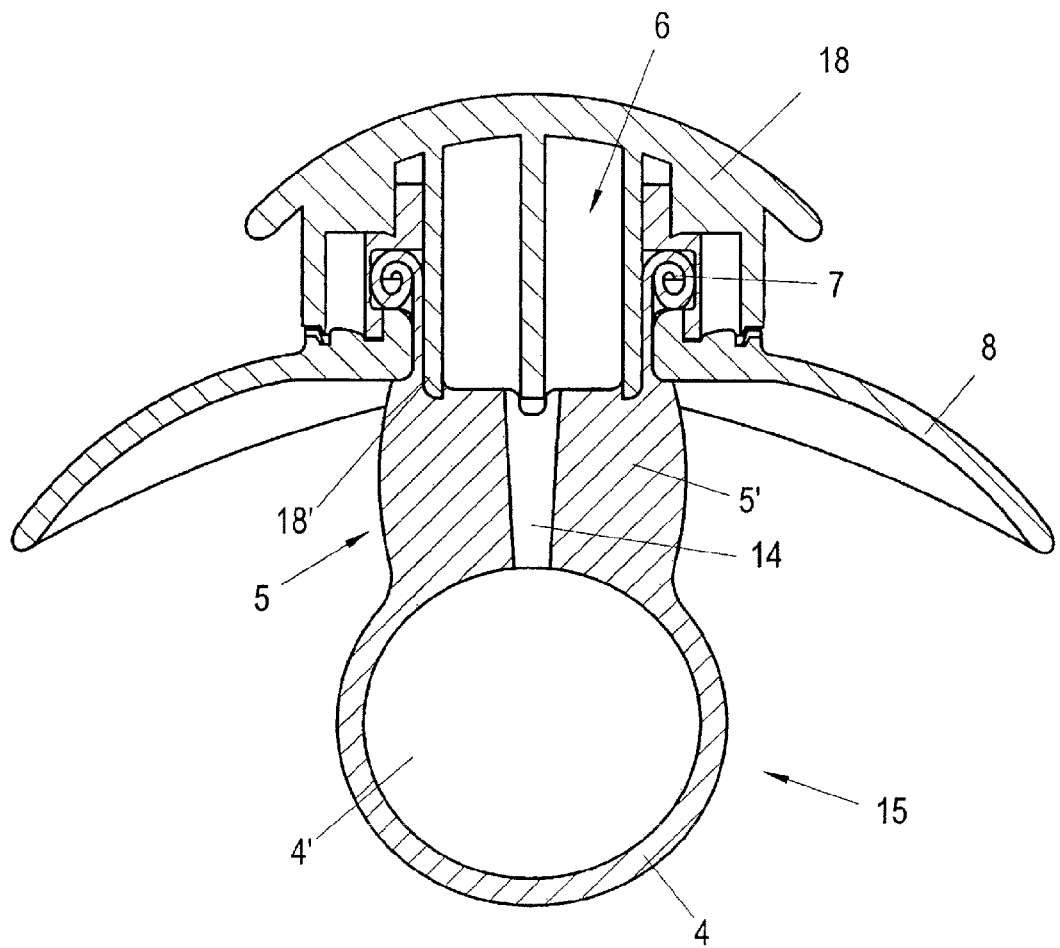
FIG. 10 shows a sectional view of the pacifier teat after attaching it to a pacifier shield.

In the sectional view according to FIG. 10 it can be seen that the stem 5, which is designed substantially single-walled in the region of the stem after connecting the two wall sections 5', may be attached to a pacifier shield 8 in a conventional manner. For this, a fastening element 18 which is known per se is provided, entering the opening 6 with the larger cross-section of the pacifier teat 15 and/or the hollow body 3 via a plug-shaped protrusion 18', with the stem 5 and/or the flange 7 being received between the pacifier shield 8 and the fastening element 18 in a form-fit and a force-fit manner. Since the duct 14 remains open in the connecting region to the pacifier shield 8 and/or the fastening element 18, a vent for the hollow space 4' as well as a pressure equalisation with the environment is made possible in a reliable manner.

The invention claimed is:

1. A method for producing a pacifier teat with a teat section which forms a hollow space and which is adjoined by a stem having a region of contact with the jaw and/or the teeth of a user, the method comprising:
   opposite wall sections of a pre-formed elastic hollow body, which has been formed by injection moulding or dipping, are connected to each other in the region of the stem of contact with the jaw and/or the teeth of a user,
   wherein wall sections are connected by gluing to each other or by chemically and/or physically cross-linking with each other,
   wherein an elastic hollow body comprising the teat section and the stem is injection moulded or pre-formed by a dipping method,
   wherein opposite wall sections of the pre-formed hollow body are connected to each other in the region of contact with the jaw and/or the teeth of a user,
   wherein a connecting material in viscous state is introduced between the opposite wall sections and then the connecting material is converted into an elastic state by applying pressure and/or heat in order to connect the wall sections
   wherein a pressure for connecting the wall sections is selected such that the wall thickness of the wall sections in the connecting region is reduced to at least 80% of the wall thickness of the wall sections before connecting the wall sections.

2. The method according to claim 1, wherein the pre-formed hollow body comprises an opening, wherein a linear element extending into the hollow space created by the teat section is inserted into the pre-formed hollow body before connecting both wall sections to each other.

3. The method according to claim 1, wherein at least one duct-shaped indentation extending from the hollow space of the teat section through the stem to an opening is formed during the forming of the pre-formed hollow body.

4. The method according to claim 1, wherein undesired chemical constituents including nitrosamines are washed off the hollow body before connecting the wall sections.

5. The method according to claim 1, wherein the hollow body is heated for at least 30 minutes at 70 to 100° C. while applying pressure and/or contacting the wall sections.

6. The method according to claim 1, wherein the hollow body is heated for between 20 and 30 hours at approximately 70 to 100° C. in a furnace when the wall sections are no longer pressed against each other.

7. A method for producing a pacifier teat with a teat section which forms a hollow space and which is adjoined by a stem having a region of contact with the jaw and/or the teeth of a user, the method comprising:
   opposite wall sections of a pre-formed elastic hollow body, which has been formed by injection moulding or dipping, are connected to each other in the region of the stem of contact with the jaw and/or the teeth of a user,
   wherein wall sections are connected by gluing to each other or by chemically and/or physically cross-linking with each other,
   wherein an elastic hollow body comprising the teat section and the stem is injection moulded or pre-formed by a dipping method,
   wherein opposite all sections of the preformed hollow body are connected to each other in the region of contact with the jaw and/or the teeth of a user,
   wherein the hollow body consists of a rubber material that has not yet been completely vulcanized, wherein contact is established between the wall sections to be connected before the rubber material is completely vulcanized by adding heat,
   wherein a pressure for connecting the wall sections is selected such that the wall thickness of the wall sections in the connecting region is reduced to at least 80% of the wall thickness of the wall sections before connecting the wall sections.

8. The method according to claim 7, wherein the pre-formed hollow body comprises an opening, wherein a linear element extending into the hollow space created by the teat section is inserted into the pre-formed hollow body before connecting both wall sections to each other.

9. The method according to claim 7, wherein at least one duct-shaped indentation extending from the hollow space of the teat section through the stem to an opening is formed during the forming of the pre-formed hollow body.

10. The method according to claim 7, wherein undesired chemical constituents including nitrosamines are washed off the hollow body before connecting the wall sections.

11. The method according to claim 7, wherein the hollow body is heated for at least 30 minutes at 70 to 100° C. while applying pressure and/or contacting the wall sections.

12. The method according to claim 7, wherein the hollow body is heated for between 20 and 30 hours at approximately 70 to 100° C. in a furnace when the wall sections are no longer pressed against each other.

* * * * *